Oct. 12, 1954   A. SCHNEIDER   2,691,688
PROCESS FOR THE PREPARATION OF ISOPENTANE
Filed Aug. 10, 1950
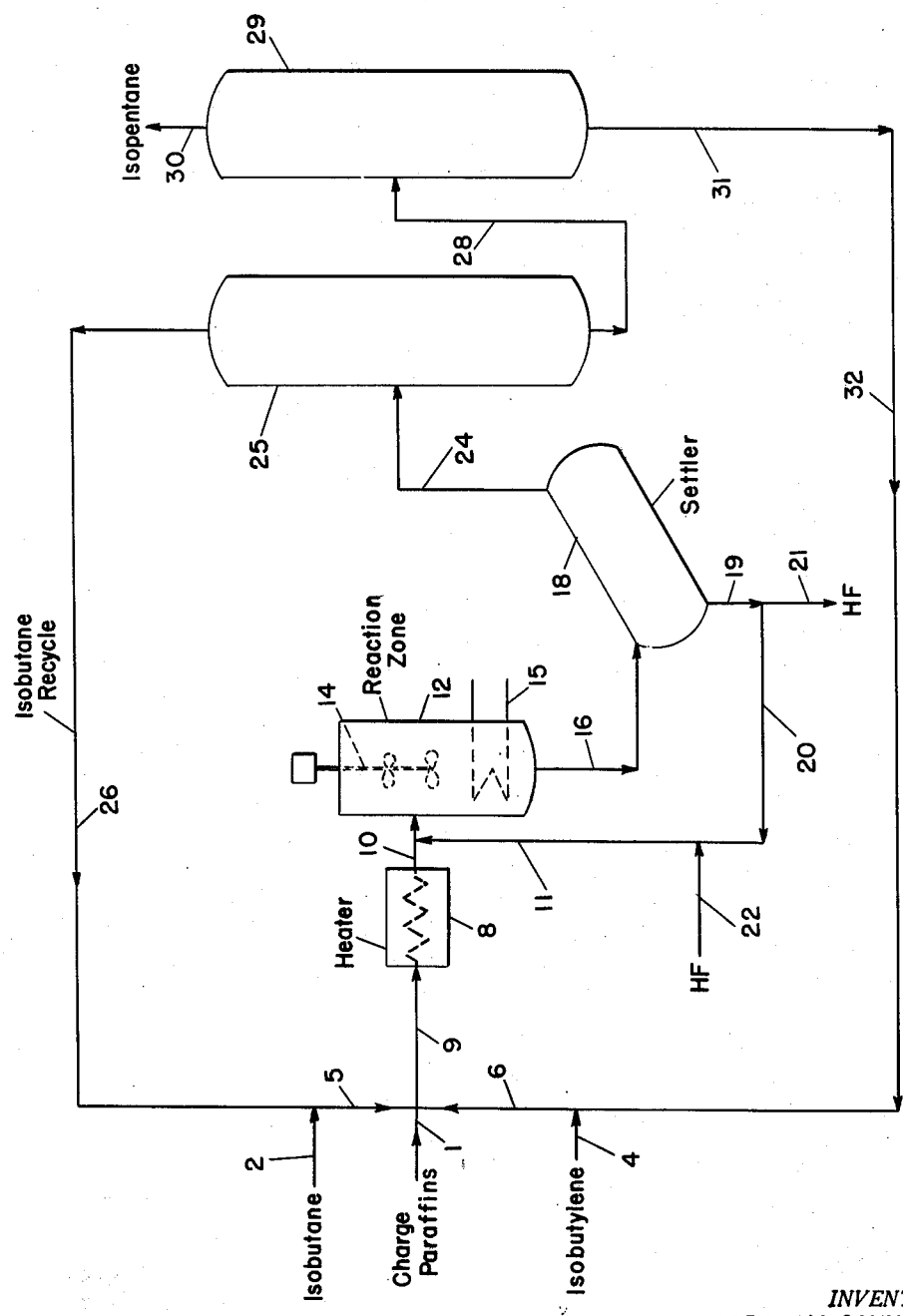
INVENTOR.
ABRAHAM SCHNEIDER
BY Busser and Harding
ATTORNEYS Patented Oct. 12, 1954

2,691,688

UNITED STATES PATENT OFFICE 2,691,688

PROCESS FOR THE PREPARATION OF ISOPENTANE

Abraham Schneider, Philadelphia, Pa., assignor to Sun Oil Company, Philadelphia, Pa., a corporation of New Jersey Application August 10, 1950, Serial No. 178,612

2 Claims. (Cl. 260—676)

This invention relates to a method for producing isopentane from isobutane and hydrocarbons having at least six carbon atoms per molecule. More particularly, the invention is directed to a process for preparing isopentane by interacting isobutane and a higher molecular weight paraffinic charge by a disproportionation reaction catalyzed by hydrogen fluoride and an olefin.

Isopentane, because of its high octane number and volatility characteristics, is a particularly good component of gasoline for use in spark type internal combustion engines. Isobutane is unsuitable for use in significant quantities in gasoline because of its high volatility. Isobutane has heretofore been converted to isopentane by various reactions, including disproportionation. Disproportionation reactions are well known, and generally employ catalysts such as aluminum chloride promoted with hydrogen chloride. Such processes, however, have the disadvantage of preparing a wide variety of products, and hence only small yields of a specific product may be obtained. A further serious disadvantage of such processes is rapid catalyst deactivation, which requires frequent additions of fresh catalyst or catalyst regeneration. Catalyst deactivation is especially rapid when olefins or aromatics are present in the charge stock. Hydrogen fluoride and BF₃ have also been proposed as disproportionation catalysts, the presence of olefins being taught as possibly desirable. This process, however, has disadvantages including deactivation of the catalyst by complex formation involving the system: hydrogen fluoride-boron fluoride-olefin. For example, olefins tend to accumulate in and deactivate the catalyst, and hence it is essential to subject the catalyst to frequent regeneration. A further disadvantage of this process is the extreme corrosive nature of the combination, HF-BF₃, which prohibits its use in commercial installations.

An object of the present invention is to provide a commercially feasible process for the preparation of isopentane. Another object is to provide a process for the conversion of isobutane to isopentane using a novel combination of catalytic components, wherein one catalytic component has a long life and wherein consumption of the other catalytic component enhances the yield of isopentane. A further object is to provide a process for lowering the average molecular weight of a hydrocarbon mixture. Other objects appear hereinafter.

It has now been discovered that isobutane, under the influence of hydrogen fluoride and an olefin, interacts with paraffins having at least one tertiary hydrogen atom and at least six carbon atoms per molecule to form isopentane as the primary product. It has been found that the present reaction is practically instantaneous, i. e., the reaction is complete as soon as the components are mixed. It has been further found that the olefin employed as an essential catalytic component is converted to the corresponding paraffin which is then available for reaction in the process. Thus, the olefin employed, instead of deactivating the catalyst by complex formation, causes an improvement in the yield of the desired product, as is more fully described hereinafter.

In carrying out the process of the invention, isobutane is mixed with a hydrocarbon having at least one tertiary hydrogen atom and six carbon atoms per molecule, or a mixture of such hydrocarbons. These are caused to react in the liquid phase by bringing together hydrogen fluoride and an olefin in the presence thereof. By the expressions "bringing together," "contacting," and terms of similar import, as employed herein relative to the catalytic component, is meant the actual physical mixing thereof, which in the present process is always performed in the presence of both the isobutane and the higher isoparaffin. The ingredients of the reaction mixture may be admixed in any order, except that it is essential that the hydrogen fluoride and olefin be admixed only in the presence of both the isobutane and the higher hydrocarbons, since otherwise the catalytic condition required to achieve the present reaction is dissipated, and instead of the desired reaction there results alkylation of the isobutane by the olefin, polymerization of the olefin, and other undesired reactions. The hydrogen fluoride and olefin, when so contacted, establish a catalytic condition effective to cause disproportionation whereby isobutane is selectively converted to isopentane.

The higher molecular weight hydrocarbons which are suitable for reaction with isobutane according to the present invention are the isoparaffin hydrocarbons which have at least six carbon atoms per molecule. By the expression, "isoparaffin hydrocarbons," and "isoparaffins," is meant branched chain paraffins having at least one tertiary hydrogen atom per molecule. Any paraffin hydrocarbon having at least one tertiary hydrogen atom and at least six carbon atoms per molecule or a mixture of such paraffins, are capable of interacting with isobutane to produce isopentane in accordance with the present invention.

The present invention is based on the discovery that isobutane will interact with the above specified isoparaffin hydrocarbons or mixtures of such hydrocarbons under the influence of hydrogen fluoride and an olefin such as isobutylene. It has been further found, however, that the reaction, which may be referred to as disproportionation, must be conducted in the substantial absence of aromatic and naphthenic hydrocarbons. The presence of either of these types of hydrocarbons, except in very small amounts, will substantially prevent the desired reaction from taking place. Aromatics are more deleterious than the naphthenes, especially the lower boiling aromatics, and should be present, if at all, only in small concentrations. Small amounts of aromatics may be tolerated, since they are alkylated by the olefin and then are substantially inert in the process. However, such alkylated aromatics reduce the efficacy of the hydrogen fluoride, and hence it is preferred to operate the process in the substantial absence of aromatics.

As specific examples of charge paraffins which are operative in carrying out the reaction, the following may be employed: 2-methylpentane; 3-methylpentane, 2-methylhexane; 3-methylhexane; 2-methyldecane, and homologues and isomers of the described compounds. Mixtures of such hydrocarbons may be used. It is especially advantageous to employ, as the higher hydrocarbon, mixtures of higher hydrocarbons obtained from petroleum, such as the gasoline, naphtha, kerosene, and gas oil fractions. Synthetically prepared hydrocarbons, such as Fischer-Tropsch gasoline and gas oil fractions, may also be employed. However, in view of the previously stated fact that the charge material should be substantially free of aromatics and naphthenes, it is apparent that fractions such as straight run naphtha, thermal naphtha, and catalytically cracked naphtha should not be employed as the charge material unless they are first treated to remove both the aromatic and naphthene hydrocarbons present in such fractions.

The present process is specific to the conversion of isobutane to isopentane. Other hydrocarbons may not be substituted for isobutane, and other hydrocarbons which do not meet the requirements as above stated for isoparaffins having at least six carbon atoms per molecule are inert in the process. For example, propane and normal butane may not be substituted for isobutane; isopentane does not undergo a corresponding reaction with isoparaffins having at least seven carbon atoms to form isohexane. In these and other instances except as specifically set forth for the present process, reactions such as alkylation and polymerization predominate. The isobutane employed may, of course, be admixed with other hydrocarbons, such as ethane, propane, and n-butane, which are substantially inert and serve as diluents. Higher hydrocarbons which do not have a tertiary hydrogen atom are also inert and serve as diluents.

Olefins which may be employed as a catalytic component are the mono-olefins having at least three carbon atoms, and generally from three to about ten carbon atoms per molecule. Isobutylene is a preferred olefin to employ as the catalyst. In exerting its catalytic action, isobutylene is immediately converted to isobutane, which is then available for reaction to form isopentane. In this manner, the yield of the desired product, isopentane, is enhanced, and substantially no fouling of the hydrogen fluoride by the olefin is observed. Other preferred olefins are those having six or more carbon atoms in which case, after exerting their catalytic effect, they are converted to a corresponding paraffin and then enter into the disproportionation reaction with isobutane to form isopentane. Olefins having five carbon atoms per molecule are also preferred, in which case isopentane is formed and enhances the yield of the desired product. Propylene may be employed but the corresponding paraffin, propane, does not enter into reaction and is recovered as propane from the reaction mixture. Because of its ready availability, propylene is a preferred olefin to employ. Specific illustrations of preferred olefins are: isobutylene; butene-1; pentene-2; hexene-1; hexene-2; hexene-3; 1-methyl pentene-2; 2-methyl pentene-1; and the various heptenes, octenes, homologues thereof, and the like, and mixtures thereof.

In carrying out the process of the present invention reactions other than disproportionation may occur, such as alkylation of the isobutane by the olefin. Such an undesired reaction is inhibited to a large extent by operating under the preferred conditions of temperature and concentration of reactants and catalytic components.

The operable temperature range is from —20° C. to about 150° C., and preferably from 10° C. to 60° C. At temperatures below the stated range, disproportionation does not occur to any substantial extent and other reactions predominate whereas at temperatures above the stated range cracking reactions occur which defeat the objects of the present process.

It is also important, in order to achieve high yields of isopentane, that the components of the reaction mixture be maintained within relatively narrow limits. The mole ratio of isobutane to higher isoparaffin should be maintained within the range of from 2:1 to 10:1, and preferably from 3:1 to 6:1, and the mole ratio of higher isoparaffin to olefin should be within the range of from 1:0.1 to 1:2, and preferably from 1:0.25 to 1:0.75. Operation outside of the stated ranges results in the occurrence to a substantial extent of reactions other than the desired disproportionation. The concentration of hydrogen fluoride to employ is not critical but should be above 25% by volume of the hydrocarbons charged. For practical purposes, an equal volume of hydrogen fluoride and hydrocarbons may be employed, and seldom is it desirable to employ more than two volumes of hydrogen fluoride per volume of hydrocarbons.

The pressure employed in the present reaction should be sufficient to keep the reaction components in the liquid phase, a pressure of from about 20 to 150 p. s. i. being suitable, although in some instances lower pressures, such as atmospheric pressure, or higher pressures, up to about 1000 p. s. i., which may be obtained by use of an inert gas, such as nitrogen, may be employed.

As above stated, the present reaction occurs substantially as fast as the components of the reaction mixture are admixed, and hence time is not considered a critical variable. Practical considerations usually require a mixing time, or reaction time, of from about two minutes to about one hour, although a longer time does not have a deleterious effect.

The reaction may be conducted as a continuous process by mixing the charge paraffins with isobutane in excess of the amount consumed in the reaction, continuously introducing the mixture into a reaction zone and therein contacting hydrogen fluoride and an olefin. The olefin may be first added to the reaction mixture, followed by the hydrogen fluoride, or the hydrogen fluoride may be first added. It is not permissible to premix the catalytic components, hydrogen fluoride and an olefin, since in such case, the required catalytic condition cannot thereafter be established in the presence of the reactants. The olefin may be introduced in admixture with the isobutane or the higher hydrocarbon, it being required that the olefin and hydrogen fluoride be admixed only in the presence of both isobutane and the higher paraffin with which it is to react. It is preferred to add the olefin to a stirred admixture of hydrogen fluoride, isobutane, and higher isoparaffin. The reaction mixture may be continuously withdrawn from the reaction zone and the mixture of hydrocarbons obtained subjected to successive distillations to recover the excess isobutane and to obtain the isopentane which has been formed as product of the reaction. The hydrocarbons from the reaction mixture which boil above isopentane are isoparaffins which are capable of entering into the desired reaction with isobutane and may therefore also be returned to the reaction zone for further conversion to isopentane.

It appears that the reaction involves the interaction of isobutane with the higher molecular weight paraffinic components of the charge, resulting in the extraction of methylene groups from such components and transfer of the same to the isobutane, thereby forming isopentane and paraffins having one less carbon atom than the initial higher paraffins in the charge material. Isomerization of the charge isoparaffins may also occur, and the isomers formed similarly will interact with isobutane to produce isopentane and paraffins having one less carbon atom than such isomers. The lower molecular weight paraffins thus formed will react in turn with isobutane in the same manner, yielding further amounts of isopentane and paraffins of still one less carbon atom which in turn will similarly react with isobutane. In this manner a progressive degradation in molecular weight is effected with the concurrent consumption of isobutane and production of isopentane. Complete conversion of the higher molecular weight paraffins into isopentane, of course, is not accomplished in one-pass through the reaction zone. The degree of conversion will depend upon the particular charge hydrocarbons employed, the amount of catalyst used, the reaction temperature, and the like. By separating the isopentane from the reaction product and returning hydrocarbons of higher molecular weight than isopentane to the reaction zone, most of the charge hydrocarbons may eventually be converted into isopentane.

A preferred embodiment of the present invention is the simultaneous preparation of isopentane and the degradation of isoparaffins boiling above gasoline hydrocarbons to isoparaffins boiling within the gasoline range. Thus, by interaction, in accordance with the present process, isobutane with isoparaffins boiling above the gasoline range, isopentane is produced, and the isoparaffins are degraded into gasoline isoparaffins, at which point they are recovered for use in gasoline compositions.

A further preferred embodiment of the present invention is the simultaneous preparation of isopentane and 2,3-dimethylbutane. This is accomplished by interacting isobutane with paraffins having two alkyl substituents attached to separate carbon atoms, such as 2,4-dimethylpentane; 2,3-dimethylpentane, 2,4-dimethylhexane; 2,5-dimethylhexane; 2,4-dimethylhexane; 2-methyl-4-ethylhexane, and homologues and isomers of the listed compounds. The mechanism of this reaction is complicated and is not fully understood. It has been found, however, that interacting isobutane and paraffins having at least two alkyl substituents on different carbon atoms under the catalytic influence of hydrogen fluoride and an olefin, produces isopentane, and that 2,3-dimethylbutane is the end product of the degradation of the di-substituted paraffin.

The accompanying drawing shows a diagrammatic flow sheet of one method of carrying out the process. The flow sheet is to be considered merely illustrative and numerous modifications may be made without departing from the scope of the invention.

The higher molecular weight charge paraffins enter the system through line 1, isobutane through line 2, and isobutylene, used to illustrate the various olefins which may be employed, through line 4. Isobutane and isobutylene pass through lines 5 and 6, respectively, and form an admixture with the charge paraffins which passes to heat exchanger 8 via line 9, wherein the temperature of the admixture is adjusted to the desired value. The admixture then passes through line 10 wherein HF is added from line 11. On contacting the HF and olefin in the presence of isobutane and the charge paraffins, conversion of isobutane to isopentane commences and is completed substantially as soon as the ingredients are admixed, with the isobutylene being converted to isobutane. To insure complete mixing, reaction zone 12 provided with means for agitation, such as mixer 14, is advantageously employed but may be omitted if the turbulence in line 10 is sufficient to obtain good mixing. Since a solid phase is not present in the reaction mixture, mild agitation is sufficient to achieve good results in the process. Coil 15 is provided in order to maintain the temperature of the reaction mixture within the desired range. On completion of the reaction, the reaction mixture passes through line 16 into settler 18, wherein the hydrogen fluoride and hydrocarbon layers are separated. Hydrogen fluoride is removed from the bottom of settler 18 through line 19 and is recycled to the process through lines 20 and 11. If desired, all or a portion of the hydrogen fluoride may be removed from the system through line 21, and fresh hydrogen fluoride may be added through line 22. The hydrocarbon layer passes from the top of settler 18 through line 24 and is introduced into distillation zone 25, wherein isobutane is removed as distillate and is recycled to the system through lines 26 and 5. The higher boiling hydrocarbons pass through line 28 to a second distillation zone 29, wherein isopentane, the desired product of the present process, is separated as distillate and is removed from the system through line 30. The remaining higher boiling hydrocarbons, in whole or in part, are recycled to the process through lines 31, 32 and 6 for further reaction with isobutane.

Valves, pumps, gauges, and the like, the location and operation of which will be apparent to those skilled in the art, have been omitted from the flow sheet for simplicity.

The following examples illustrate the process of the present invention, which is not to be considered as limited thereby:

Example 1

To an admixture of 0.74 moles (64 g.) of 2-methylpentane, 3.32 moles (192.5 g.) of isobutane, and 8.15 moles (163 g.) of hydrogen fluoride were added over a period of seven minutes 0.83 moles (46.5 g.) of isobutylene. The reaction mixture was stirred for about sixteen minutes at a temperature of 20° C. The hydrocarbon layer was separated from the acid layer and fractionated to separate the components. There were recovered 2.29 moles (132.5 g.) of isobutane, 0.54 moles (38.5 g.) of isopentane, 0.198 moles (17 g.) of methylpentanes, and 106 g. of higher boiling hydrocarbons. Thus, in the reaction, 31% of the isobutane and 73% of the 2-methylpentane were converted.

The acid layer appeared clear and was not contaminated to any practical extent.

Example 2

Following the procedure of Example 1, 0.47 moles of 2-methylpentane, 2.12 moles of isobutane, and 10.1 moles of hydrogen fluoride were admixed and 0.36 moles of isobutylene introduced into the admixture over a period of about five minutes. After stirring for about fifteen minutes at 20° C., the hydrocarbon layer was separated and the components thereof separated by fractionation. There were recovered 1.48 moles of isobutane, 0.22 moles of isopentane, and 0.19 moles of methylpentanes.

Example 3

Following the procedure described for Example 1, a catalytically cracked gasoline fraction (average molecular weight=93) boiling between 42° C. and 110° C. was substituted for 2-methylpentane. The fraction contained about 60 volume percent of isoparaffins having at least six carbon atoms, a trace of aromatics, and 30 volume percent naphthenes (alkylcyclopentanes). 67 g. of the described material, 49 g. of isobutylene, 194 g. of isobutane, and 163 g. of hydrogen fluoride were employed, the reaction being conducted at 20° C.

There were recovered 162.9 g. of isobutane, 11 g. of isopentane, and major portion of higher boiling materials.

This example demonstrates that the presence of naphthenes inhibits the desired reaction, only a slight amount of isobutane being converted to isopentane.

The invention claimed is:

1. Process for the simultaneous preparation of isopentane and 2,3-dimethylbutane which comprises reacting isobutane with a paraffin hydrocarbon having 2 tertiary hydrogen atoms by bringing together in the presence of a mixture of isobutane and said paraffin hydrocarbon, hydrogen fluoride and an olefin having at least 3 carbon atoms as the sole catalytic components, separating isopentane from the reaction mixture, introducing additional isobutane to the reaction mixture and continuing the reaction until said paraffin hydrocarbon is converted to 2,3-dimethylbutane, and separating isopentane and 2,3-dimethylbutane as the sole products of the process.

2. Process according to claim 1 wherein said olefin is isobutylene.

References Cited in the file of this patent

UNITED STATES PATENTS

| Number | Name | Date |
| --- | --- | --- |
| 2,375,867 | Newman | May 15, 1945 |
| 2,376,051 | Hackmuth | May 15, 1945 |
| 2,403,649 | Frey | July 9, 1946 |
| 2,405,996 | Burk | Aug. 20, 1946 |